US011103064B1

(12) United States Patent
Lin

(10) Patent No.: US 11,103,064 B1
(45) Date of Patent: Aug. 31, 2021

(54) ACCOMMODATION APPARATUS HAVING ANTI-PEEPING FUNCTION

(71) Applicant: LANNER ELECTRONICS INC., New Taipei (TW)

(72) Inventor: Tse-Min Lin, New Taipei (TW)

(73) Assignee: LANNER ELECTRONIC INC.

( * ) Notice: Subject to any disclaimer, the term of this patent is extended or adjusted under 35 U.S.C. 154(b) by 0 days.

(21) Appl. No.: 16/893,439

(22) Filed: Jun. 5, 2020

(30) Foreign Application Priority Data

Feb. 14, 2020 (TW) ................. 109201653

(51) Int. Cl.
*A47B 88/944* (2017.01)

(52) U.S. Cl.
CPC .... *A47B 88/944* (2017.01); *A47B 2210/0056* (2013.01)

(58) Field of Classification Search
CPC ....... A47B 88/40; A47B 88/90; A47B 88/944; A47B 88/963
USPC ........ 312/330.1, 334.1, 334.8, 334.27, 348.4
See application file for complete search history.

(56) References Cited

U.S. PATENT DOCUMENTS

| 3,311,437 | A | * | 3/1967 | Peebles | A47B 95/04 312/296 |
| 4,557,533 | A | * | 12/1985 | Koch | G11B 33/04 206/308.3 |
| 5,549,375 | A | * | 8/1996 | Pagliaccio | G06F 1/181 312/223.2 |
| 7,261,385 | B2 | * | 8/2007 | Weinberger | A47B 67/04 312/298 |
| 7,547,050 | B1 | * | 6/2009 | Miglieri | E05B 65/0014 292/288 |
| 2008/0067901 | A1 | * | 3/2008 | Chen | A47B 95/02 312/109 |
| 2010/0123376 | A1 | * | 5/2010 | Burdine | A47B 88/919 312/330.1 |

* cited by examiner

*Primary Examiner* — James O Hansen

(57) ABSTRACT

An accommodation apparatus having anti-peeping function is disclosed, and comprises: an accommodating unit, two loading boxes, and two spacing gap filling unit. The two spacing gap filling unit is disposed between the two loading boxes, and between a top inner wall of the accommodating space and one of the two loading boxes that is located upper the other one. According to particular design of the present invention, after the two loading boxes are inserted into the accommodating space through the opening, one of the two elastic members closely contacting the bottom plate of the loading box, and the other one closely contacting the top inner wall of the accommodating space, such that the accommodation apparatus has advantages of anti-peeping and electromagnetic interference (EMI) shielding, and enhances structural stability thereof.

3 Claims, 5 Drawing Sheets

ACCOMMODATION APPARATUS HAVING ANTI-PEEPING FUNCTION

BACKGROUND OF THE INVENTION

1. Field of the Invention

The present invention relates to the technology field of accommodation apparatus, and more particularly to an accommodation apparatus having anti-peeping function.

2. Description of the Prior Art

Along with data digitalization and development of cloud computing, it brought convenience in our life. When the data digitalization is used more widely, its products and development are getting more important and valuable.

Thus, stability and security of the data digitalization are also receiving more attention. The Federal Information Processing Standards is the U.S. government standard that defines minimum security requirements for cryptographic modules. Contractors of the U.S. government have to adopt the said standard, other large corporation also adopt the said standard to ensure data security of their customer. On the other hand, it is generally using computer case with drawable mechanism to enhance convenience of a computer case with high capacity in case of testing or replacing elements therein. Typically, there is a gap between the computer case and a loading boxes to move the loading boxes more smoothly. However, the gap causes the computer case lack of structure of electrostatic discharge protection (ESD), such that it doesn't meet the Federal Information Protection System (FIPS) level 2 standard.

FIG. 1 shows a schematic diagram for describing an operation of a conventional drawable accommodation device having anti-peeping function. The conventional drawable accommodation device 1' comprises three loading boxes (11',12', 13'), and each of the loading boxes comprises a front plate (F1', F2', F3'). As FIG. 1 shows, there is a height difference between the respective loading boxes (11',12', 13') and the correspondingly-respective front plate (F1', F2', F3') to block another loading box (11',12', 13'), so as to meet the FIPS level 2 standard. Although, the conventional drawable accommodation device 1' meets the FIPS level standard and has anti-peeping function. However, it still has shortcomings and drawbacks as follows:

(1) As shown in FIG. 1, the conventional drawable accommodation device 1' achieves anti-peeping function by the height difference between the loading boxes (11',12', 13') and its front plate (F1', F2', F3'). However, when a user wants to draw out one of the loading boxes (11',12', 13'), the user has to draw out the loading boxes one by one from the lowest loading box. As a result, the conventional drawable accommodation device 1' has a disadvantage of inconvenience and time-wasting.

In view of the conventional drawable accommodation device 1' still has shortcomings and drawbacks in practical application, inventors of the present application have made great efforts to make inventive research thereon and eventually provided an accommodation apparatus having anti-peeping function.

SUMMARY OF THE INVENTION

The primary objective of the present invention is to disclose an accommodation apparatus having anti-peeping function is disclosed, and comprises: an accommodating unit, two loading boxes, and two spacing gap filling unit. The accommodating unit has an accommodating space and an opening. The two loading boxes are stacked to each other and are disposed in the accommodating space. The two spacing gap filling unit are disposed between the two loading boxes also a top inner wall of the accommodating space and one of the two loading boxes that is located upper the other one. By an elastic member of the spacing gap filling unit, the accommodation apparatus has cushioning function to enhance the structural stability and durability thereof.

For achieving the primary objective of the present invention, the inventor of the present invention provides an embodiment for the accommodation apparatus having anti-peeping function, comprises:

an accommodating unit, having an accommodating space and an opening;
> two loading boxes, being disposed in the accommodating space, and being stacked to each other; wherein each of the loading box comprises a bottom plate, two side plates and a front plate; and
> two spacing gap filling unit, being disposed between the two loading boxes as well as a top inner wall of the accommodating space and one of the two loading boxes that is located upper the other one; wherein each of the spacing gap filling unit comprises:
>> a front plate connecting member, being connected to the front plate of the loading box, and having a connecting plate that is horizontally disposed on a top side of the front plate; wherein the connecting plate is provided with a plurality of engaging holes thereon;

an elastic member, being disposed on the connecting plate, and having an excurvature surface; and
a plurality of engaging members, being connected to two sides of the elastic member, such that the respective engaging members are embedded into the respective engaging holes in case of the elastic member being disposed on the connecting plate;
> wherein after the two loading boxes are inserted into the accommodating space through the opening, one of the two elastic members closely contacting the bottom plate of the loading box, and the other one closely contacting the top inner wall of the accommodating space.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an accommodation apparatus having anti-peeping function according to the present invention, embodiments of the present invention will be described in detail with reference to the attached drawings hereinafter.

Figure 1:
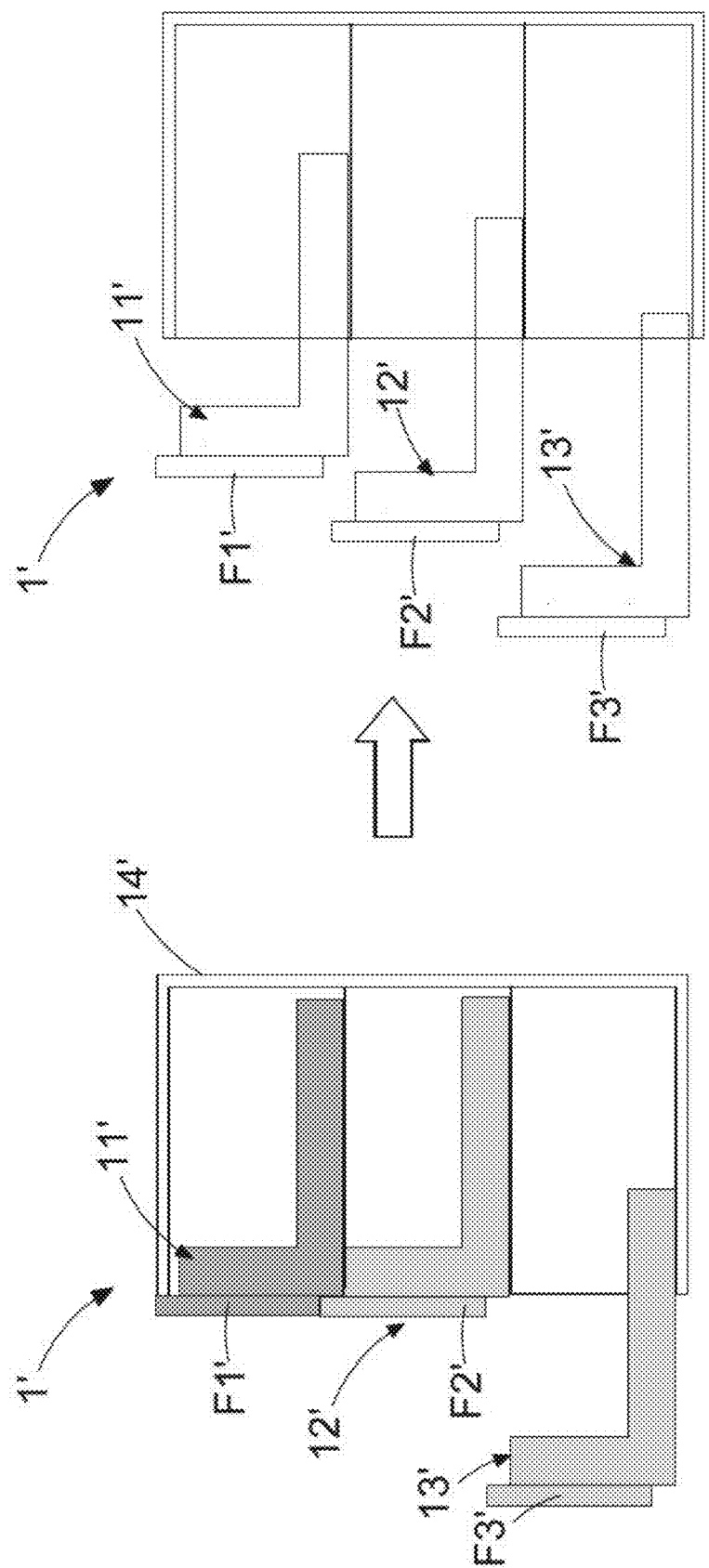
FIG. 1 shows a schematic diagram for describing an operation of a conventional drawable accommodation device having anti-peeping function
Figure 2:
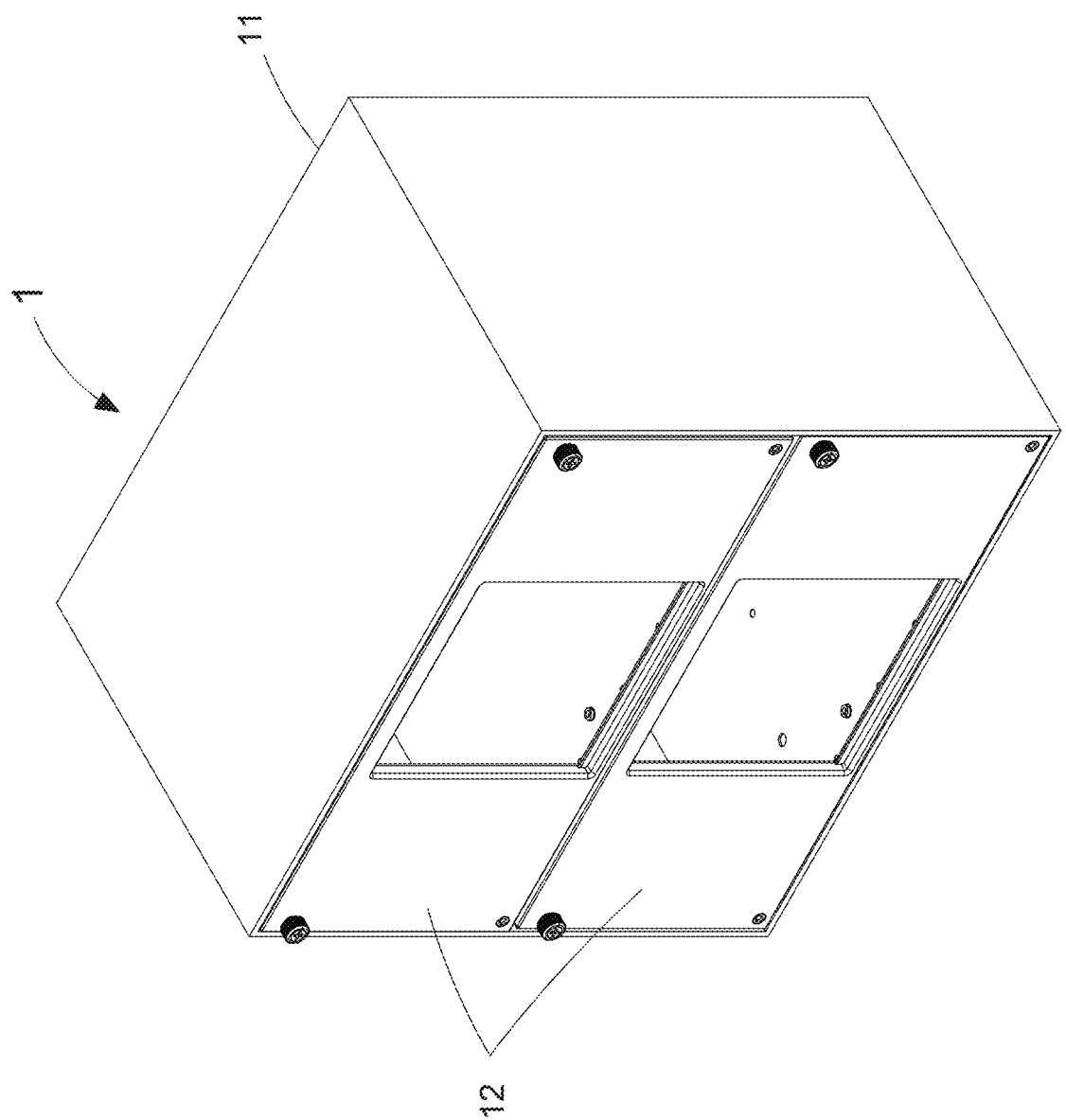
FIG. 2 shows a stereo view of an accommodation apparatus having anti-peeping function according to the present invention.
Figure 3:
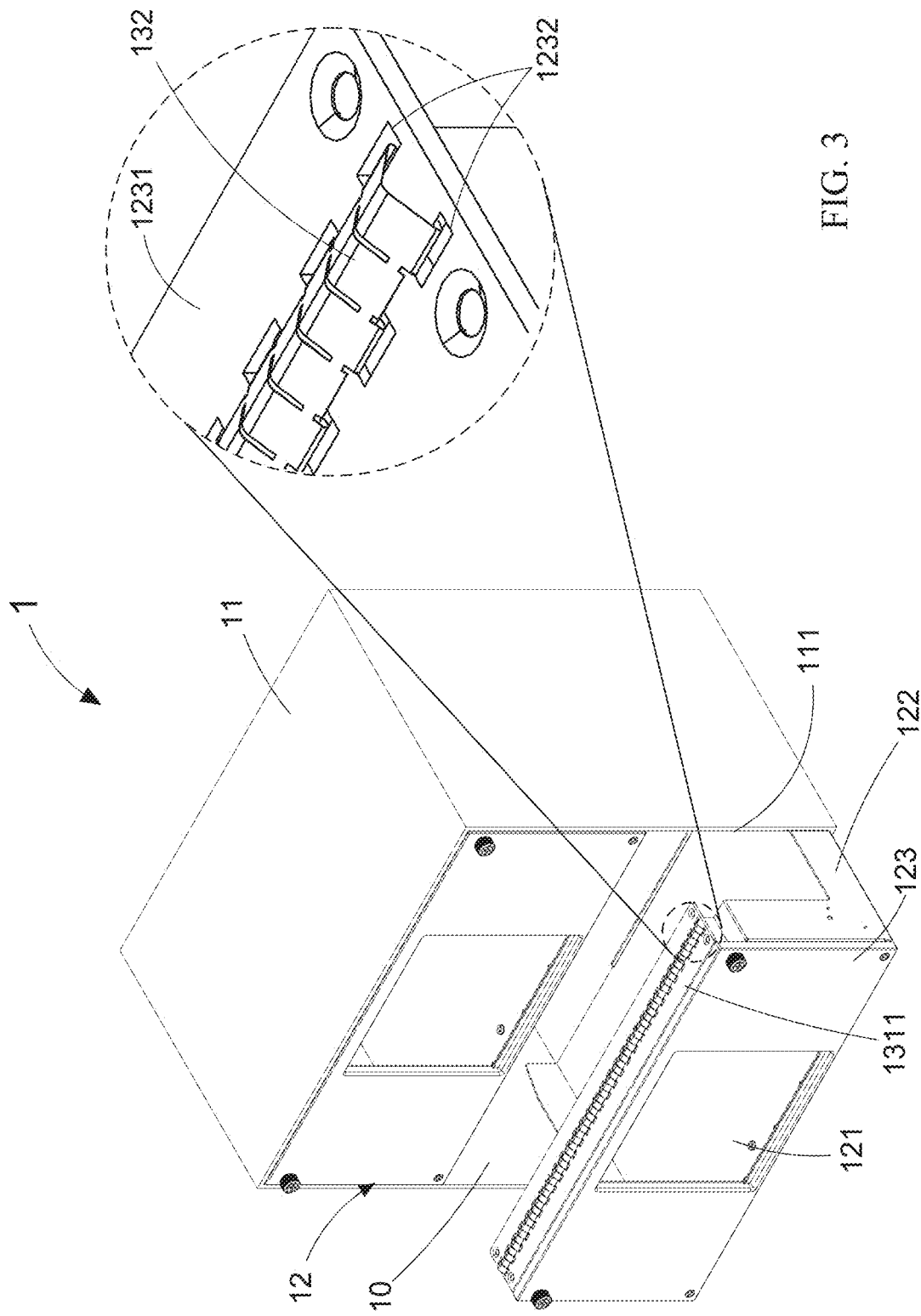
FIG. 3 shows a schematic stereo view of the accommodation apparatus having anti-peeping function according to the present invention.

With reference to FIG. 2, there is provided a stereo view of an accommodation apparatus having anti-peeping function according to the present invention. And please simultaneously refer to FIG. 3, which shows a schematic stereo view of the accommodation apparatus having anti-peeping function according to the present invention. As shown in FIG. 2 and FIG. 3, an accommodation apparatus 1 of the present invention comprises: an accommodation unit 11, two loading boxes 12, two spacing gap filling unit 13. The accommodating unit 11 has an accommodating space 10 and an opening 111. Moreover, the two loading boxes 12 are disposed in the accommodating space 10, and stacked to each other. Each of the loading box 12 comprises a bottom plate 121, two side plates 122, and a front plate 123. The two spacing gap filling unit 13 are disposed between the two loading boxes 12 as well as a top inner wall of the accommodating space 10 and one of the two loading boxes 12 that is located upper the other one.

Continuously referring to FIG. 2 and FIG. 3. And please simultaneously refer to FIG. 4A and FIG. 4B, which show a stereo view of the elastic member and a stereo view of the elastic member with another perspective. Each of the spacing gap filling unit 13 comprises: a front plate connecting member 1231, an elastic member 132, and a plurality of engaging member 133. In the present invention, the front plate connecting member 1231 is connected to the front plate 123 of the respective loading box 13, and is presented by a form of a connecting plate that is horizontally disposed on a top side of the front plate 123. Moreover, the front plate connecting member (i.e., connecting plate) 1231 is provided with a plurality of engaging holes 1232 thereon. It is worth noting that, the elastic member 132 is disposed on the front plate connecting member (i.e., connecting plate) 1231 and having an encurvature surface. More particularly, the plurality of engaging member 133 are connected to two sides of the elastic member 132, such that the respective engaging member 133 are embedded into the respective engaging holes 1232 in case of the elastic member 132 being disposed on the front plate connecting member (i.e., connecting plate) 1231.

Figure 4B:
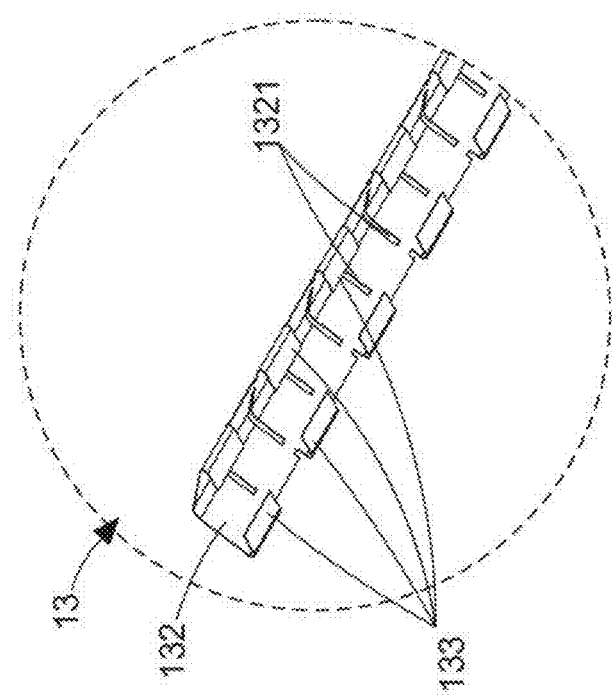
FIG. 4B shows a stereo view of the elastic member with another perspective.
Figure 4A:
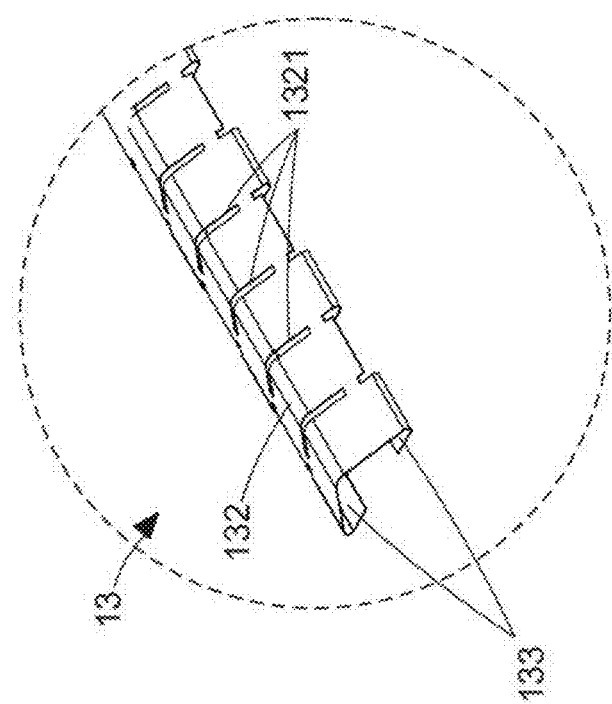
FIG. 4A shows a stereo view of the elastic member.
Figure 5:
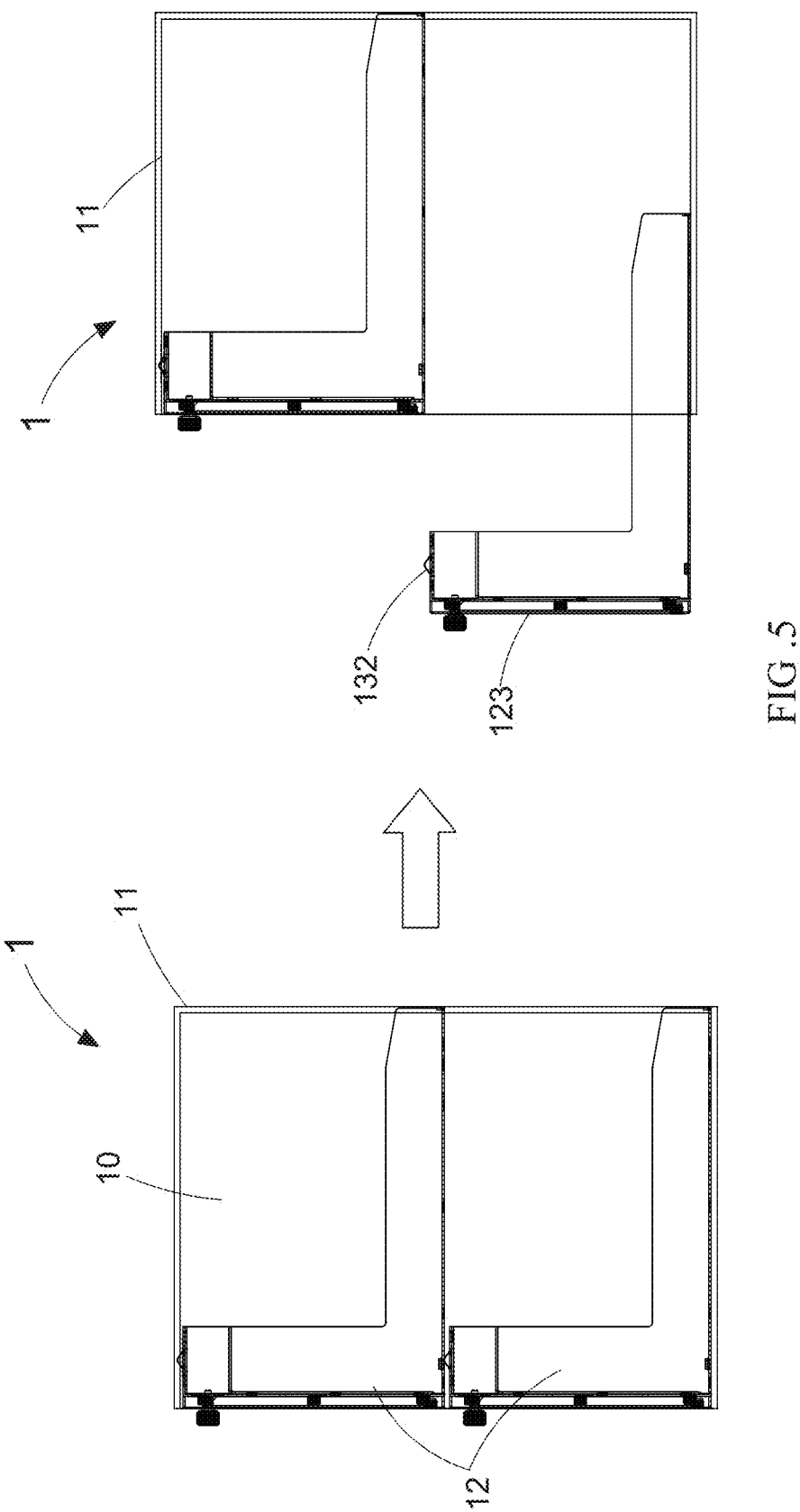
FIG. 5 shows a schematic diagram for describing an operation of the accommodation apparatus having anti-peeping function according to the present invention.

Continuously referring to FIG. 3, FIG. 4A and FIG. 4B. And please simultaneously refer to FIG. 5, which shows a schematic diagram for describing an operation of the accommodation apparatus having anti-peeping function according to the present invention. Inheriting to above descriptions, after the two loading boxes 12 are inserted into the accommodating space 10 through the opening 111, one of the two elastic members 132 closely contacting the bottom plate 121 of the loading box 12, and the other one closely contacting the top inner wall of the accommodating space 10. Moreover, each of the loading boxes 12 comprises two drawer slides, the two drawer slides are connected to the bottom of the loading boxes 13 respectively. A side of the elastic member 132 is in the shape of a triangle, a right angled, a prism, or a U-letter. It is worth noting that, the elastic member 132 comprises a plurality of apertures 1321 on the excurvature surface. By such arrangements, the accommodation apparatus 1 of the present invention meets the Federal Information Protection System (FIPS) lever 2 standards by the design of the two spacing gap filling unit 13. Therefore, the accommodation apparatus 1 has advantages of anti-peeping and electromagnetic interference (EMI) shielding, and enhances structural stability thereof.

Inheriting to above descriptions above descriptions, spacing gaps between the two loading boxes 12, also the accommodating unit 11 and one of the two loading boxes 12 that is located upper the other one are filled by the two spacing gap filling unit 13, such that a sheet of paper isn't allowed to inset into the spacing gaps. By the elastic member 132 of the spacing gap filling unit 13, the accommodation apparatus 1 has cushioning function to enhance the structural stability and durability thereof.

Therefore, through above descriptions, the accommodation apparatus having anti-peeping function proposed by the present invention have been introduced completely and clearly; in summary, the present invention includes the advantages of:

(1) The conventional drawable accommodation device 1' have to draw out the loading boxes (11', 12', 13') one by one from the lowest loading box 13' causing a disadvantage of inconvenience. The accommodation apparatus 1 of the present invention comprises: an accommodating unit 11, two loading boxes 12, two spacing gap filling unit 13. Wherein the two loading boxes 12 are stacked to each other and are disposed in an accommodating space 10 of the accommodating unit 11, and each of loading box 12 comprises a bottom plate 121, two side plates 122, and a front plate 123. The accommodation apparatus 1 meets the Federal Information Protection System (FIPS) lever 2 standards by the design of the two spacing gap filling unit 13. Furthermore, by the elastic member 132 of the spacing gap filling unit 13, the accommodation apparatus 1 has cushioning function to enhance the structural stability and durability thereof.

The above description is made on embodiments of the present invention. However, the embodiments are not intended to limit scope of the present invention, and all equivalent implementations or alterations within the spirit of the present invention still fall within the scope of the present invention.

What is claimed is:

1. An accommodation apparatus having anti-peeping function, comprising:
   an accommodating unit, having an accommodating space and an opening;
      two loading boxes, being disposed in the accommodating space, and being stacked to each other; wherein each of the loading box comprises a bottom plate, two side plates and a front plate; and
   two spacing gap filling unit, being disposed between the two loading boxes as well as a top inner wall of the accommodating space and one of the two loading boxes that is located upper the other one; wherein each of the spacing gap filling unit comprises:
   a front plate connecting member, being connected to the front plate of the loading box, and having a connecting plate that is horizontally disposed on a top side of the front plate; wherein the connecting plate is provided with a plurality of engaging holes thereon;
   an elastic member, being disposed on the connecting plate, and having an excurvature surface; and
   a plurality of engaging members, being connected to two sides of the elastic member, such that the respective engaging members are embedded into the respective engaging holes in case of the elastic member being disposed on the connecting plate;

wherein after the two loading boxes are inserted into the accommodating space through the opening, one of the two elastic members closely contacting the bottom plate of the loading box, and the other one of the two elastic members closely contacting the top inner wall of the accommodating space.

2. The accommodation apparatus of claim 1, wherein a side of the elastic member is in the shape of a triangle, a right angle, a prism, or a U-shaped letter.

3. The accommodation apparatus of claim 1, wherein the elastic member comprises a plurality of apertures on the excurvature surface.

\* \* \* \* \*